US008473147B2

(12) United States Patent
Ghoneim

(10) Patent No.: US 8,473,147 B2
(45) Date of Patent: Jun. 25, 2013

(54) STATE OF HEALTH INDICATOR FOR A VEHICLE FUEL DELIVERY SYSTEM

(75) Inventor: Youssef A. Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/069,457

(22) Filed: Mar. 23, 2011

(65) Prior Publication Data

US 2012/0245789 A1 Sep. 27, 2012

(51) Int. Cl.

*F02D 41/00* (2006.01)
*G06F 7/00* (2006.01)
*F02D 41/22* (2006.01)
*F02D 41/30* (2006.01)
*F02D 41/14* (2006.01)
*F02D 41/20* (2006.01)

(52) U.S. Cl.

CPC .......... *F02D 41/221* (2013.01); *F02D 41/3082* (2013.01); *F02D 2041/1416* (2013.01); *F02D 2041/1433* (2013.01); *F02D 2041/2027* (2013.01); *F02D 2041/224* (2013.01)
USPC .......................................... 701/29.4; 701/34.4

(58) Field of Classification Search

USPC .............. 701/29.1, 29.2, 31.9, 32.1; 340/679; 318/563; 700/79–81
IPC ........................................................ G01M 15/05
See application file for complete search history.

(56) References Cited

U.S. PATENT DOCUMENTS 6,556,900 B1 * 4/2003 Brynielsson ................. 701/31.4
7,324,008 B2 * 1/2008 Payne et al. ................... 340/679
7,659,685 B2 * 2/2010 Cesario et al. ................ 318/712
2007/0251501 A1 * 11/2007 Sawut et al. .................. 123/458
2007/0296375 A1 * 12/2007 Sakaguchi et al. ............ 318/811
2009/0009113 A1 * 1/2009 Rodriguez et al. ....... 318/400.15
2009/0039810 A1 * 2/2009 Gotz et al. ............... 318/400.32
2010/0169030 A1 * 7/2010 Parlos ............................. 702/58

OTHER PUBLICATIONS

Shao et al. "A Novel Microcontroller-Based Sensorless Brushless DC (BLDC) Motor Drive for Automotive Fuel Pumps", IEEE Transactions on Industry Applications, vol. 39, No. 6, Nov./Dec. 2003, pp. 1734-1740.*

Gamazo-Real et al. "Position and Speed Control of Brushless Dc Motors Using Sensorless Techniques and Application Trends", Sensors, vol. 10, Jul. 2010, pp. 6901-6947.*

Acarnley et al. "Review of Position-Sensorless Operation of Brushless Permanent-Magnet Machines", IEEE Transactions on Industrial Electronics, vol. 53, No. 2, Apr. 2006, pp. 352-362.*

* cited by examiner

*Primary Examiner* — James Trammell
*Assistant Examiner* — Todd Melton
(74) *Attorney, Agent, or Firm* — Quinn Law Group, PLLC

(57) ABSTRACT

A method for determining a state of health (SOH) value for a fuel delivery system in a vehicle includes estimating speeds of a calibrated fuel pump and an actual fuel pump using an extended state observer, calculating a deviation between the estimated speeds, and determining the progress of the deviation over a calibrated interval. The method further includes calculating the SOH value using the progress of the deviation, and automatically executing a control action corresponding to the SOH value. The system may be an Electronic Returnless Fuel System, and the pump may be controlled using pulse width modulation. A fuel delivery system for a vehicle includes a fuel pump operable for supplying fuel to the engine, a fuel tank containing the fuel pump, and a controller having the state observer noted above. A vehicle includes the fuel system, engine, and controller noted above.

17 Claims, 1 Drawing Sheet

STATE OF HEALTH INDICATOR FOR A VEHICLE FUEL DELIVERY SYSTEM

TECHNICAL FIELD

The present disclosure relates to a method and apparatus for determining the state of health of a fuel delivery system in a vehicle.

BACKGROUND

The supply of fuel to an internal combustion engine in a consistent and reliable manner is essential to proper vehicle operation. A typical vehicle fuel system includes a fuel pump which is submerged in a fuel tank. A fuel filter and a pressure regulator may be positioned on the respective intake and outlet sides of the fuel pump. Filtered fuel is thus delivered to a fuel rail, where it is ultimately injected into the engine cylinders. An Electronic Returnless Fuel System (ERFS) includes a sealed fuel tank and lacks a dedicated fuel return line. These and other features of the ERFS help to minimize vehicle emissions.

Conventional diagnostic techniques for a vehicle fuel system typically rely on knowledge of a prior failure condition. For example, when servicing the vehicle, a maintenance technician may determine by direct testing and/or review of a recorded diagnostic code that the fuel pump requires repair or replacement. This reactive diagnosis may not occur until vehicle performance has already been compromised. A proactive approach may be more advantageous, particularly when used with emerging vehicle designs utilizing an ERFS.

SUMMARY

Accordingly, a method is disclosed for determining the state of health (SOH) of a vehicle fuel delivery system having a pulse width modulated (PWM) fuel pump, such as the type commonly used in an Electronic Returnless Fuel System (ERFS) of the type described above. The method may be embodied as a set of computer-executable instructions and recorded on tangible, non-transitory memory. A controller aboard the vehicle automatically executes the instructions from memory to calculate an SOH value, i.e., a numeric or quantitative measure, and then takes a subsequent control action which is tailored to the SOH value.

A method for determining an SOH value for a fuel delivery system in a vehicle includes estimating a speed of a calibrated fuel pump using an extended state observer and a set of nominal parameters for the calibrated fuel pump, and then estimating a speed of a fuel pump positioned a fuel tank aboard the vehicle using the state observer. The method further includes calculating a deviation between the estimated speeds of the calibrated fuel pump and the fuel pump in the fuel tank, determining the progress of the deviation over a calibrated interval, and calculating the SOH value of the fuel delivery system using the progress of the deviation. Additionally, the method includes executing a control action corresponding to the SOH value.

The nominal parameters noted above provide the controller with a validated expected baseline level of pump performance, and may include resistance, a counter or back electromotive force (EMF), and motor inductance. An estimated speed of the actual fuel pump in use for a given set of operating conditions, such as a pulse width modulation (PWM) voltage, electrical current, and pressure of the fuel pump in use, is then determined using the state observer. The SOH value provides a relative measure of the SOH of the fuel delivery system at a given time point, and therefore the control action may be tailored to the SOH value.

A fuel delivery system is disclosed for a vehicle having an engine. The fuel system includes a fuel tank, a fuel pump positioned in the fuel tank and configured for supplying fuel to the engine, and the controller noted above. A vehicle having the engine and above fuel delivery system is also disclosed.

The above features and advantages, and other features and advantages of the present invention are readily apparent from the following detailed description of the best modes for carrying out the invention when taken in connection with the accompanying drawings.

DETAILED DESCRIPTION

Figure 1:
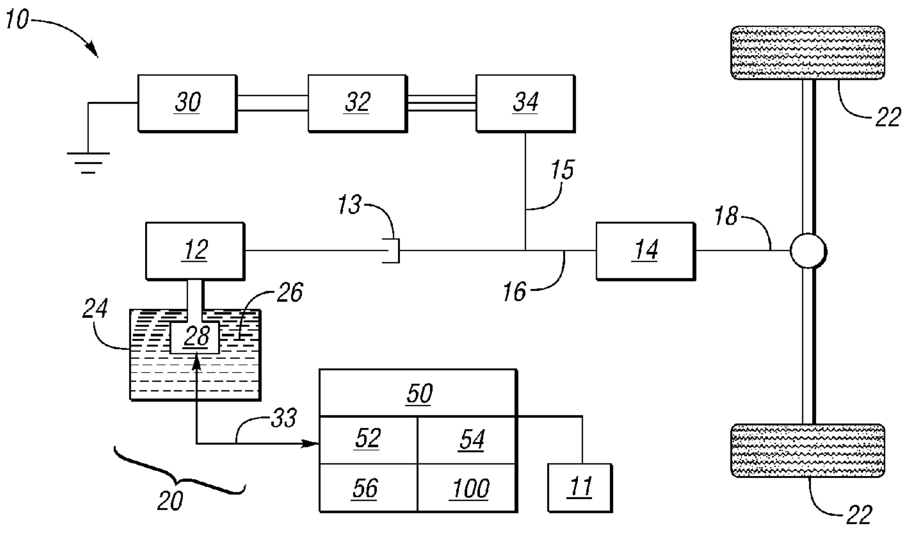
FIG. 1 is a schematic illustration of a vehicle having a fuel delivery system and a controller configured for determining a state of health (SOH) value of the fuel delivery system.

Referring to the drawings, wherein like reference numbers correspond to like or similar components throughout the several figures, and beginning with FIG. 1, a vehicle 10 includes a fuel delivery system 20 and a controller 50. The controller 50 is configured for determining a state of health (SOH) value of the fuel delivery system 20, i.e., a numeric value describing the present health of the fuel delivery system 20 relative to a calibrated, properly functioning standard. The controller 50 is further configured for executing a control action that is appropriate for the SOH value, such as presenting a message via a display 11 as explained below with reference to FIG. 2.

In one embodiment, the fuel delivery system 20 may be an Electronic Returnless Fuel System (ERFS) of the type known in the art. In an ERFS, a fuel tank 24 containing a supply of fuel 26 such as gasoline, ethanol, E85, or other combustible fuel is sealed relative to the surrounding environment. A fuel pump 28 such as a roller cell pump or a gerotor pump is submerged in the fluid 26 within the tank 24, and is operable for circulating fuel 26 to an internal combustion engine 12 in response to control and feedback signals (arrow 33) from the controller 50. For simplicity, the fuel rails and injectors of the engine 12 are omitted from FIG. 1.

The vehicle 10 includes a transmission 14 having an input member 16 and an output member 18. The engine 12 may be selectively connected to the transmission 14 using an input clutch and damper assembly 13, e.g., when the vehicle 10 is a hybrid electric vehicle (HEV). The vehicle 10 may also include a DC energy storage system 30, e.g., a rechargeable battery module, which may be electrically connected to one or more high-voltage electric traction motors 34 via a fraction power inverter module (TPIM) 32. A motor shaft 15 from the electric traction motor 34 selectively drives the input member 16 when motor torque is needed. Output torque from the transmission 14 is ultimately transferred via the output member 18 to a set of drive wheels 22 to propel the vehicle 10.

Still referring to FIG. 1, the controller 50 is in communication with the fuel delivery system 20 by way of the control and feedback signals (arrow 33). The control and feedback signals (arrow 33) may be transmitted over a controller area network (CAN), serial bus, data router(s), and/or other suitable network connections. Hardware components of the controller 50 of FIG. 1 can include one or more digital computers each having a microprocessor or central processing unit (CPU), read only memory (ROM), random access memory (RAM), electrically-programmable read only memory (EPROM), a high-speed clock, analog-to-digital (A/D) and digital-to-analog (D/A) circuitry, and input/output circuitry and devices (I/O), as well as appropriate signal conditioning and buffer circuitry.

Each set of algorithms or computer-executable instructions residing within the controller 50 or readily accessible and executable thereby, including any algorithms or computer instructions needed for executing the present method 100 as explained below with reference to FIG. 3, can be stored in tangible, non-transitory computer-readable memory 54 and executed by any host machine or other hardware portions of the controller 50 as needed to provide the disclosed functionality. An extended state observer 52 (also see FIG. 3) is included as part of the software functionality of the controller 50, with the state observer 52 applying state space feedback control law as is understood in the art. The unique function of the state observer 52 as it relates to execution of the present method 100 is described below with reference to FIGS. 2 and 3.

As noted above, the fuel pump 28 may be controlled via pulse width modulation (PWM). As applied in the field of electric motor control, PWM techniques deliver pulsed energy to a target system, e.g., the fuel pump 28 of FIG. 1, via a rectangular pulse wave. The pulse width of this wave is automatically modulated by a controller, e.g., the present controller 50, thus resulting in a particular variation of an average value of the pulse waveform. By automatically modulating the pulse width using the controller 50, energy flow can be precisely regulated to the fuel pump 28, and likewise fuel supply to the engine 12.

The fuel pump 28 may be characterized as follows:

$$\omega=f(V,P)=a(V)P+b(V)$$

where ω is the rotational speed of the fluid pump 28 in revolutions per minute (RPM), V is the PWM voltage, and P is the fuel line pressure, and where a and b are calibrated functions of the PWM voltage (V). Degradation of the fuel pump 28 within the fuel delivery system 20 will, over time, increase the PWM voltage (V) required to produce a given line pressure (P). The parameters of the actual fuel pump 28 used in the vehicle 10 may therefore gradually or suddenly deviate from nominal or baseline parameters, which may be determined beforehand using a calibrated or new pump and recorded in a lookup table 56. Therefore, by determining the progress of any deviation of an estimated speed of the fluid pump 28 in use from an estimated speed of a calibrated new fuel pump, the SOH value of the fuel delivery system 20 may be determined, and control actions may be taken proactively. This may help reduce "walk home" incidents, wherein a fuel pump ceases to deliver fuel 26 at a sufficient rate for sustaining proper firing of the engine 12.

Figure 3:
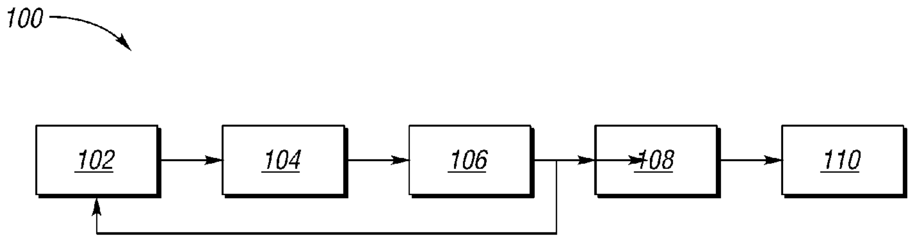
FIG. 3 is a schematic flow diagram for an extended state observer portion of the controller.

Referring to FIG. 3, an example method 100 for determining an SOH value for the fuel delivery system 20 of FIG. 1 begins with step 102, wherein the controller 50 estimates the speed of a nominal fuel pump, i.e., the calibrated or new pump noted above. Step 102 includes, in one embodiment, using the state observer 52 in conjunction with a set of nominal pump parameters extracted from the lookup table 56.

Figure 2:
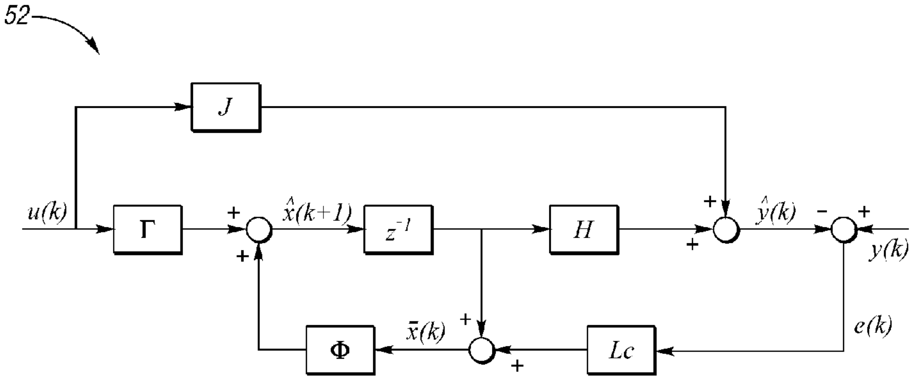
FIG. 2 is a flow chart describing a method for determining the SOH value for the fuel delivery system shown in FIG. 1.

Referring briefly to FIG. 2, a diagram is shown for one possible embodiment of the state observer 52. The state observer 52 models the fuel pump 28 in order to estimate its internal states. State estimation is performed given a set of control inputs (u) and control outputs (y). Thus, a state (x) of a system may be modeled as:

$$x(k+1)=Ax(k)+Bu(k)$$

$$y(k)=Cx(k)+Du(k)$$

where (k) represents time and A, B, C, and D are system parameters. The state observer model may be then derived as:

$$\hat{x}(k+1)=A\hat{x}(k)=L[y(k)-\hat{y}(k)]+Bu(k)$$

$$\hat{y}(k)=C\hat{x}(k)+Du(k)$$

where L is an estimator gain matrix. The above state equations will be readily understood by those of ordinary skill in the art.

Step 102 may entail extracting nominal parameters for a calibrated/new fuel pump from the lookup table 56 of FIG. 1. Nominal parameters may include pump resistance (R), back EMF ($K_e$), and motor inductance ($L_a$). The following equations may then used by the controller 50:

$$L_a\frac{di}{dt}=-Ri-K_e\omega+V,$$

$$\frac{di}{dt}=f+bu,$$

$$f=-\frac{K_e}{L_a}\omega,$$

$$b=\frac{1}{L_a},$$

$$u=V-Ri$$

The controller 50 can then derive an augmented canonical state space model as follows:

$$\dot{x}=Ax+bu+D\dot{f},$$

$$x=[i\ \ f]^T,$$

$$A=\begin{bmatrix}0&1\\0&0\end{bmatrix},$$

$$D=\begin{bmatrix}0\\1\end{bmatrix}$$

$$y=Cx,$$

$$C=[1\ \ 0].$$

Applying zero order hold (ZOH), as that term is well understood in the art, and using the block diagram shown in FIG. 2 and the above equations:

$$\hat{x}(k+1)=\Phi\hat{x}(k)+\Gamma u(k)+\Phi L(y(k)-\hat{y}(k))$$

$$\hat{y}(k)=H\hat{x}(k)+Ju(k)$$

$$\hat{\omega}=\begin{bmatrix}0&-\frac{L_a}{K_e}\end{bmatrix}\hat{x}(k)=-\hat{f}\frac{L_a}{K_e}$$

where $$\Phi=\begin{bmatrix}1&T\\0&1\end{bmatrix},\ \Gamma=\begin{bmatrix}\frac{T}{L_a}&0\end{bmatrix}^T,\ H=[1\ \ 0],$$

and $$J=0,$$

and where T within the Φ and Γ matrices represents the control loop time, e.g., 12 ms, and T external to the Γ matrix is the transverse of the matrix.

The observer gain vector (K) of the state observer 52 may be determined by placing the poles (β) of the discrete characteristic equation (λ) as follows:

$$\lambda(z)=|zI-(\Phi-\Phi KH)|=(z-\beta)^2$$

In one embodiment, β=0.5, although other values are possible. The method 100 proceeds to step 104 once the speed of the nominal fluid pump is estimated in this manner.

Referring again to FIG. 3, at step 104 the controller 50 of FIG. 1 estimates the speed of the fuel pump 28, i.e., the actual pump being used aboard the vehicle 10, doing so using the state observer 52. Step 104 is distinct from step 102 in that the nominal parameters are not used, but rather corresponding actual values for the fuel pump 28 at a given operating point. The controller 50 then proceeds to step 106.

At step 106, the controller 50 calculates the deviation of the estimated speed values from steps 102 and 104 to determine the extent of deviation of the fuel pump 28 from the nominal parameters of a calibrated or new pump, as explained above. This deviation value is recorded with prior deviation values in memory 54, e.g., in a buffer having a sufficiently large number of positions for determining progress of the deviation over time. The controller 50 then proceeds to step 108, while steps 102-106 continue to be executed in a loop, such that the progress or trajectory of the deviation is determined and monitored by the controller 50 over time. Anomalies or transient values may be disregarded in this way, with the overall trend of the deviation being the primary evaluated and monitored factor.

At step 108, the controller 50 calculates a state of health (SOH) value for the fuel delivery system 20 using the progress of the deviation as determined at step 106. For instance, in a possible SOH prognosis, the following equation may be applied by the controller 50:

$$SOH = 1 - k\left|\frac{\omega(k)-\hat{\omega}(k)}{\omega(k)}\right| = 1 - k\left|\frac{\Delta\omega(k)}{\omega(k)}\right|$$

where k in this equation is a tunable gain, and where 0<k<1. Thus, the SOH value may be calculated as a numeric value in a range of 0 to 1. An SOH value of 1 may correspond to no deviation between the speeds of the fuel pump 28 and a nominal or calibrated pump, while an SOH of 0 may correspond to a non-functioning fuel pump 28. Values moving away from 1 and toward 0 may indicate the need for proactive maintenance, with the urgency of such maintenance possibly depending on the rate at which the SOH value is decreasing. The controller 50 proceeds to step 110 once the SOH value is recorded in memory 54.

At step 110, the controller 50 may execute a suitable control action based on the SOH value recorded at step 108. One possible embodiment of step 110 includes dividing a scale of SOH values into different bands, e.g., "good", "degraded", "worn", and "impending failure". Each band may be assigned a specific range of SOH values, e.g., 1 to 0.75 for "good", etc. Diagnostic codes may be set for the various bands, with the code being recorded for reference by a maintenance technician, or by automated remote detection and reporting if the vehicle 10 is equipped with a telematics unit.

The vehicle 10 may be equipped with the display 11 as noted above. For an impending failure, the user may be alerted by the controller 50 using the display 11, e.g., by displaying a message or icon. The display 11 may be, in a simplified embodiment, a simple instrument panel warning lamp, potentially accompanied by an audible signal sufficiently warning the user of impending failure. Results falling between the extremes of "good" and "impending failure" could be presented via the display 11 or recorded as diagnostic codes, or both, depending on the severity of the SOH value and the progress of the deviation.

While the best modes for carrying out the invention have been described in detail, those familiar with the art to which this invention relates will recognize various alternative designs and embodiments for practicing the invention within the scope of the appended claims.

The invention claimed is:

1. A method for determining a numeric state of health (SOH) value for a fuel delivery system in a vehicle, the method comprising:

estimating a speed of a calibrated fuel pump using an extended state observer and a set of nominal parameters for the calibrated fuel pump, including deriving, via a controller, a canonical state space model using the set of nominal parameters;

estimating a speed of an actual fuel pump used in the fuel delivery system of the vehicle using the extended state observer and a set of measured parameters for the actual fuel pump, wherein the nominal parameters and the measured parameters each include a resistance, a back electromotive force (EMF), and an inductance of the calibrated and the actual fuel pumps, respectively;

calculating a deviation between the estimated speeds of the calibrated fuel pump and the actual fuel pump;

determining the progress of the deviation over a calibrated interval;

calculating the numeric SOH value of the fuel delivery system, wherein the numeric SOH value numerically represents the progress of the deviation over the calibrated interval; and automatically executing a control action with respect to the fuel delivery system in a manner corresponding to the SOH value.

2. The method of claim 1, further comprising:

extracting the resistance, the back EMF, and the motor inductance of the calibrated fuel pump from a lookup table;

using the extracted resistance, the back EMF, and the motor inductance as the set of nominal parameters.

3. The method of claim 1, wherein calculating the numeric SOH value includes calculating a numeric value in the range of between 0 and 1 using a tunable gain.

4. The method of claim 3, wherein automatically executing a control action includes at least one of: recording a diagnostic code and displaying an icon or message within the vehicle.

5. The method of claim 4, including displaying the icon or message only when the SOH value is less than a calibrated threshold.

6. The method of claim 3, further comprising:

dividing the range into a plurality of bands; and executing the control action in a different manner for each band in the plurality of bands.

7. The method of claim 1, further comprising:

controlling the actual fuel pump via the controller using pulse width modulation (PWM) signals;

wherein estimating the speed of the calibrated fuel pump using the extended state observer includes using the PWM signals to derive the canonical state space model.

8. A fuel delivery system for a vehicle having an engine, comprising:

a fuel tank;

an actual fuel pump positioned in the fuel tank and configured for supplying fuel to the engine; and a controller having an extended state observer;

wherein the controller is in communication with the fuel pump, and is configured to:

determine a set of nominal parameters for a calibrated fuel pump, including a nominal resistance, a nominal back electromotive force (EMF), and a nominal motor inductance of the calibrated fuel pump;

derive, via the extended state observer, a canonical state space model using the set of nominal parameters;

estimate a speed of the calibrated fuel pump using the canonical state space model;

estimate a speed of the actual fuel pump that is positioned in the fuel tank using the extended state observer and a measured set of parameters for the actual fuel pump, including a measured resistance, a measured back EMF, and a measured motor inductance of the actual fuel pump;

calculate a deviation between the estimated speeds of the calibrated fuel pump and the fuel pump positioned in the fuel tank;

determine the progress of the deviation over a calibrated interval;

calculate a numeric SOH value of the fuel delivery system using the progress of the deviation over the calibrated interval; and automatically execute a control action with respect to the fuel delivery system in a manner corresponding to the numeric SOH value.

9. The fuel delivery system of claim 8, wherein the fuel delivery system is an Electronic Returnless Fuel System, and wherein the controller is configured to control actuation of the actual fuel pump using pulse width modulation.

10. The fuel delivery system of claim 9, wherein the controller configured to calculate the numeric SOH value as a numeric value in the range of between 0 and 1 using a tunable gain.

11. The fuel delivery system of claim 9, wherein automatically executing a control action includes at least one of: recording a diagnostic code and displaying an icon or message within the vehicle.

12. The fuel delivery system of claim 8, wherein the controller includes a lookup table containing the set of nominal parameters.

13. A vehicle comprising:

an internal combustion engine; and a fuel delivery system having:

a fuel tank;

an actual fuel pump positioned within the fuel tank, and configured for supplying fuel from the fuel tank to the engine; and a controller having an extended state observer, wherein the controller is in communication with the actual fuel pump;

wherein the controller is configured to calculate a numeric state of health (SOH) value of the fuel delivery system by:

estimating a speed of a calibrated fuel pump using the extended state observer and a set of nominal parameters for the calibrated fuel pump, including deriving, via the extended state observer, a canonical state space model that uses a set of nominal parameters of the calibrated fuel pump;

estimating a speed of the actual fuel pump positioned within the fuel tank via the extended state observer using a set of measured parameters of the fuel pump, wherein the nominal and measured parameters respectively include a resistance, a back electromotive force (EMF), and a motor inductance of the respective calibrated and actual fuel pumps;

calculating a deviation between the estimated speeds of the calibrated fuel pump and the actual fuel pump;

determining the progress of the deviation over a calibrated interval;

calculating the numeric SOH value of the fuel delivery system to thereby represent the progress of the deviation over the calibrated interval; and automatically executing a control action with respect to the fuel delivery system in a manner corresponding to the calculated numeric SOH value.

14. The vehicle of claim 13, wherein the fuel tank is sealed, and wherein the controller is configured to control actuation of the fuel pump positioned within the fuel tank using pulse width modulation (PWM) signals, and to derive the canonical state space model using the PWM signals.

15. The vehicle of claim 13, wherein the controller includes a lookup table containing the set of nominal parameters.

16. The vehicle of claim 13, wherein the controller is configured for calculating the numeric SOH value as a numeric value in a range of 0 and 1 using a tunable gain.

17. The vehicle of claim 13, wherein the controller automatically executes the control action by at least one of: recording a diagnostic code and displaying an icon or message within the vehicle.

* * * * *